(12) United States Patent
Skeoch

(10) Patent No.: US 10,230,895 B2
(45) Date of Patent: Mar. 12, 2019

(54) SYSTEM AND METHOD FOR MANAGEMENT OF BATTERY POWER

(71) Applicant: NETGEAR, INC., San Jose, CA (US)

(72) Inventor: Steve Skeoch, Carlsbad, CA (US)

(73) Assignee: NETGEAR, INC., San Jose, CA (US)

( * ) Notice: Subject to any disclaimer, the term of this patent is extended or adjusted under 35 U.S.C. 154(b) by 4 days.

(21) Appl. No.: 14/927,027

(22) Filed: Oct. 29, 2015

(65) Prior Publication Data
US 2017/0126973 A1    May 4, 2017

(51) Int. Cl.
*H02J 7/34* (2006.01)
*H02J 13/00* (2006.01)
*H04N 5/232* (2006.01)

(52) U.S. Cl.
CPC ........... *H04N 5/23241* (2013.01); *H02J 7/34* (2013.01); *H02J 13/0003* (2013.01)

(58) Field of Classification Search
None
See application file for complete search history.

(56) References Cited

U.S. PATENT DOCUMENTS

| | | | | |
|---|---|---|---|---|
| 5,739,596 A * | 4/1998 | Takizawa | ................ | G06F 1/263 307/64 |
| 6,204,633 B1 * | 3/2001 | Kitagawa | .................. | H02J 7/34 320/128 |
| 2004/0192407 A1 * | 9/2004 | Formenti | .............. | H02J 7/0013 455/572 |
| 2009/0206795 A1 * | 8/2009 | Stanesti | ................ | H02J 7/0057 320/135 |
| 2011/0096168 A1 * | 4/2011 | Siann | ..................... | H04N 7/183 348/158 |

* cited by examiner

*Primary Examiner* — Twyler L Haskins
*Assistant Examiner* — Quan Pham
(74) *Attorney, Agent, or Firm* — Duane Morris LLP

(57) ABSTRACT

The invention is directed to battery power management. In one embodiment, the invention provides a battery control unit for managing battery power supplied to a product, the battery control unit including: a first battery and a second battery coupled to each other in a parallel configuration, each of the first and second batteries having a negative terminal coupled to an electrical ground of the product; a first switch having a first terminal coupled to a positive terminal of the first battery and a second terminal coupled to a power terminal of the product; a second switch having a third terminal coupled to a positive terminal of the second battery and a fourth terminal coupled to the power terminal; a first voltage sense unit coupled to the positive terminal of the first battery for sensing a voltage at the positive terminal of the first battery; a second voltage sense unit coupled to the positive terminal of the second battery for sensing a voltage at the positive terminal of the second battery; a first control unit coupled to the first switch for controlling the first switch in response to the voltage sensed by the first voltage sense unit; and a second control unit coupled to the second switch for controlling the second switch in response to the voltage sensed by the second voltage sense unit.

22 Claims, 8 Drawing Sheets

SYSTEM AND METHOD FOR MANAGEMENT OF BATTERY POWER

FIELD OF THE INVENTION

The invention is related generally to batteries and, more particularly, to a method and circuit for preventing damage to electronic devices or systems that are powered by batteries, by disabling one or more batteries that are determined to be mismatched, defective or damaged.

BACKGROUND OF THE INVENTION

The use of batteries to power electronic devices and systems is ubiquitous today. When used in consumer products such as handheld electronic devices, or larger systems such as wireless camera networks, for example, batteries must provide power for extended periods of time and do so in a safe and reliable manner. Care must be taken, however, when using multiple batteries in parallel and/or in series to form a battery pack. For example, many types of battery cells, such as certain types of Lithium cells, are prone to over-heating and catching fire if one or more cells in the battery pack are mismatched, defective or damaged. One common solution to protecting against cell fires is to design a battery pack with internal protection mechanisms such as preventing replacement of individual cells, resettable fuses, etc.

As another measure to minimize the risk of faulty battery packs, manufacturers carefully select batteries that match in voltage (when cells are used in parallel) and in capacity (when cells are used in series). The matched cells are then assembled in a respective battery pack, which is then tested before shipping. Needless to say, the process of selecting matching cells and subsequently testing the assembled battery packs increases the time and cost of manufacturing the battery packs.

Despite the safeguards used to protect against faulty battery packs, as discussed above, the use of battery packs in electronic devices and systems still pose undesirable risks and hazards. For example, in many consumer products, although a battery pack used to power the product may be in good working condition when initially purchased, over time, one or more cells in the battery pack may degrade more rapidly than other cells in the pack, which could unduly degrade the performance of the entire battery pack, or cause a catastrophic failure of the battery pack (e.g., a fire).

As another example, for many consumer products (e.g., a wireless IP camera) that utilize battery packs as a power source, consumers will often replace the original batteries with new batteries (e.g., rechargeable batteries). Doing so, however, poses an undesirable risk because the cells are not necessarily properly matched for series and/or parallel operation, and therefore there is risk of overheating or possibly even fire under certain fault conditions. Some exemplary fault conditions are discussed below with reference to FIG. 1.

FIG. 1 illustrates a block diagram of a conventional battery pack 100 having two batteries 102 and 104, designated as "Battery A" and "Battery B," respectively, connected in parallel. As shown in FIG. 1, the negative terminals of each battery 102 and 104 are connected to electrical ground, and their positive terminals are each connected to $P_{SYS}$, which designates a power node of an electrical device or system (not shown) powered by the battery pack 100. In this way, battery pack 100 provides power (i.e., voltage and current) to the electrical device or system.

An exemplary fault condition can occur if one of the batteries, e.g., battery 102 (Battery A), is defective or damaged such that it produces zero volts and/or becomes a short circuit. When a user inserts the second battery 104 (Battery B) into the battery pack, the first battery 102 (Battery A) can appear as an electrical short circuit that will cause a rapid discharge of the second battery 104 (Battery B) if no current limiting devices are installed and/or active in either battery 102 or 104. The result can be extremely high currents that can generate extreme heat and possibly cause a fire or explosion, in addition to diminishing the life of the second battery 104 (Battery B). This is a relatively common failure of Lithium type cells that should be avoided.

As another example of a fault condition, if the first battery 102 (Battery A) is good, but has lower voltage than the second battery 104 (Battery B) when installed, this could also result in an unrestricted current flow from the second battery 104 (Battery B) to the first battery 102 (Battery A). As discussed above, such a high current flow may be hazardous (e.g., cause a fire), as well as being detrimental to the life of the first battery 102 (Battery A), as the unrestricted current can exceed recommended operating parameters.

As a further example, if the first battery 102 (Battery A) and the second battery 104 (Battery B) are made from different technologies, such as Li-Ion and Li—FePO4 technologies, for example, which most consumers do not understand, this condition can again result in batteries having different voltages and consequently higher than normal operating currents as the battery pack circuit 100 tries to equalize their voltages. The high currents can lead to dangerously high temperatures and/or a fire, in addition to significantly diminishing the life of the battery pack.

In view of the above exemplary problems associated with prior art battery packs and their use in electronic devices and systems, there is a need for a method and apparatus for safeguarding against one or more mismatched, degraded or damaged batteries in a battery pack.

SUMMARY OF THE INVENTION

The invention addresses the above and other needs by providing a method and circuit for sensing when one or more battery strings in a battery pack may be mismatched, defective or damaged, and if one or more such battery strings are detected, taking measures to prevent damage to any remaining battery strings of the battery pack, or to the device or system powered by the battery pack.

In one embodiment, the invention provides a battery control unit for managing battery power supplied to a product, the battery control unit including: a first battery and a second battery coupled to each other in a parallel configuration, each of the first and second batteries having a negative terminal coupled to an electrical ground of the product; a first switch having a first terminal coupled to a positive terminal of the first battery and a second terminal coupled to a power terminal of the product; a second switch having a third terminal coupled to a positive terminal of the second battery and a fourth terminal coupled to the power terminal; a first voltage sense unit coupled to the positive terminal of the first battery for sensing a voltage at the positive terminal of the first battery; a second voltage sense unit coupled to the positive terminal of the second battery for sensing a voltage at the positive terminal of the second battery; a first control unit coupled to the first switch for controlling the first switch in response to the voltage sensed by the first voltage sense unit; and a second control unit coupled to the second switch for controlling the second switch in response to the voltage sensed by the second voltage sense unit.

In a further embodiment, a battery-powered wireless node camera is provided that includes: an image sensor for capturing image data; a radio unit for performing wireless communications with at least one external device; a processor for controlling the image sensor and radio unit; and a battery control unit, wherein the battery control unit includes: a first battery and a second battery coupled to each other in a parallel configuration, each of the first and second batteries having a negative terminal coupled to an electrical ground; a first switch having a first terminal coupled to a positive terminal of the first battery and a second terminal coupled to a power terminal of a respective node camera; a second switch having a third terminal coupled to a positive terminal of the second battery and a fourth terminal coupled to the power terminal; a first voltage sense unit coupled to the positive terminal of the first battery for sensing a voltage at the positive terminal of the first battery; a second voltage sense unit coupled to the positive terminal of the second battery for sensing a voltage at the positive terminal of the second battery; a first control unit coupled to the first switch for controlling the first switch in response to the voltage sensed by the first voltage sense unit; and a second control unit coupled to the second switch for controlling the second switch in response to the voltage sensed by the second voltage sense unit.

In a further embodiment, a wireless camera network is provided that includes: a plurality of battery-powered, wireless node cameras, each node camera comprising an image sensor for capturing image data, a radio unit for performing wireless communications, at least one processing unit for controlling the image sensor and radio unit, and a battery control unit; and an access point configured to communicate wirelessly with each of the node cameras, and further configured to communicate with a control center that communicatively couples the access point to a computer network, wherein the battery control unit in each node camera, includes: a first battery and a second battery coupled to each other in a parallel configuration, each of the first and second batteries having a negative terminal coupled to an electrical ground; a first switch having a first terminal coupled to a positive terminal of the first battery and a second terminal coupled to a power terminal of a respective node camera; a second switch having a third terminal coupled to a positive terminal of the second battery and a fourth terminal coupled to the power terminal; a first voltage sense unit coupled to the positive terminal of the first battery for sensing a voltage at the positive terminal of the first battery; a second voltage sense unit coupled to the positive terminal of the second battery for sensing a voltage at the positive terminal of the second battery; a first control unit coupled to the first switch for controlling the first switch in response to the voltage sensed by the first voltage sense unit; and a second control unit coupled to the second switch for controlling the second switch in response to the voltage sensed by the second voltage sense unit.

In another exemplary embodiment, the invention is directed to a method for managing battery power supplied to a product containing a battery pack having a first battery and a second battery coupled to each other in a parallel configuration, the method including: determining if a voltage output of the first battery in an unloaded state ($V_{AU}$) is greater than a voltage output of the second battery in an unloaded state ($V_{BU}$); if $V_{AU}$ is determined to be greater than $V_{BU}$, determining if $V_{AU}$ is greater than a first minimum threshold voltage ($V_{UMIN}$); if $V_{AU}$ is determined to be greater than $V_{UMIN}$, turning on the first switch to enable the first battery to provide power to the device; if $V_{AU}$ is determined not to be greater than $V_{BU}$, determining if $V_{BU}$ is greater than $V_{UMIN}$; and if $V_{BU}$ is determined to be greater than $V_{UMIN}$, turning on the second switch to enable the second battery to provide power to the device.

In yet another embodiment, the invention provides a computer-readable medium for storing computer-executable instructions that when executed perform a method for managing battery power supplied to a product containing a battery pack having a first battery and a second battery coupled to each other in a parallel configuration, the method including: determining if a voltage output of the first battery in an unloaded state ($V_{AU}$) is greater than a voltage output of the second battery in an unloaded state ($V_{BU}$); if $V_{AU}$ is determined to be greater than $V_{BU}$, determining if $V_{AU}$ is greater than a first minimum threshold voltage ($V_{UMIN}$); if $V_{AU}$ is determined to be greater than $V_{UMIN}$, turning on the first switch to enable the first battery to provide power to the device; if $V_{AU}$ is determined not to be greater than $V_{BU}$, determining if $V_{BU}$ is greater than $V_{UMIN}$; and if $V_{BU}$ is determined to be greater than $V_{UMIN}$, turning on the second switch to enable the second battery to provide power to the device.

BRIEF DESCRIPTION OF THE DRAWINGS

In the following description of exemplary embodiments, reference is made to the following figures which form a part hereof, and in which it is shown by way of illustration specific embodiments in which the invention may be made and practiced. It is to be understood that other embodiments may be utilized, and design and/or structural changes may be made, without departing from the scope of the invention. The Figures are provided for purposes of illustration only and merely depict exemplary embodiments of the invention to facilitate the reader's understanding of the invention and should not be considered limiting of the breadth, scope, or applicability of the invention. It should be noted that for clarity and ease of illustration these drawings may omit certain features, components or details that are not pertinent to understanding the respective embodiments of the invention depicted, and further, the drawings are not necessarily drawn to scale.

DETAILED DESCRIPTION OF EXEMPLARY EMBODIMENTS OF THE INVENTION

In the following description of exemplary embodiments, reference is made to the accompanying drawings which form a part hereof. It is to be understood that other embodiments may be utilized and changes may be made without departing from the scope of the invention. For example, although various embodiments and features of the invention are described below in the context of a battery-powered, wireless camera network, it will be appreciated by those of ordinary skill in the art that various features and advantages of the invention can be applied to any other electronic device or system that is powered by a battery pack.

Figure 1:
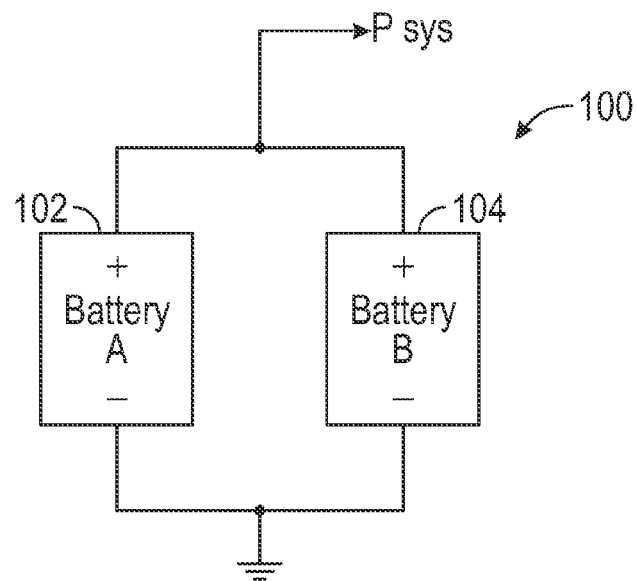
FIG. 1 is a schematic diagram of a conventional battery pack having two batteries connected in parallel.
Figure 2:
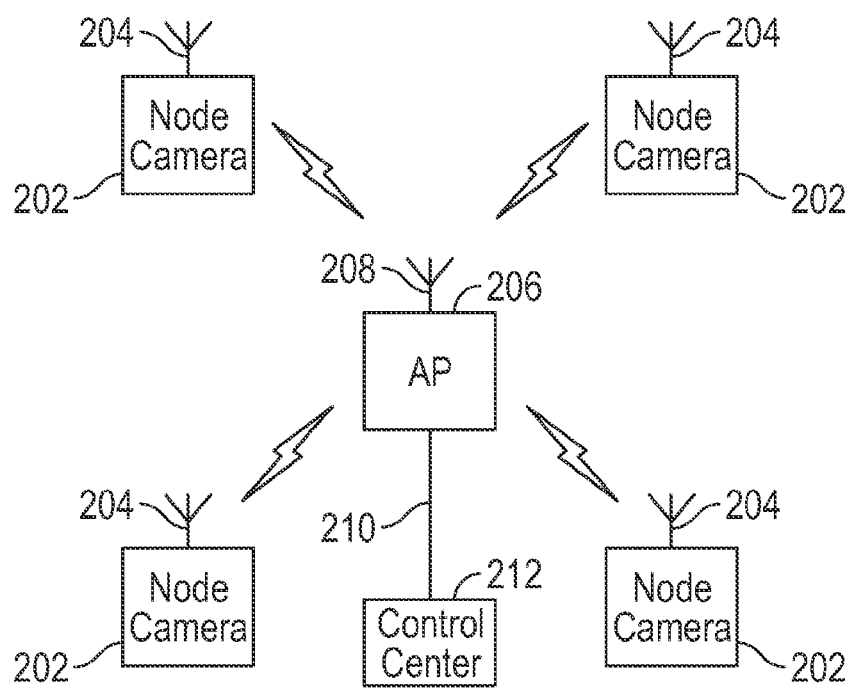
FIG. 2 is block diagram of a wireless camera system, in accordance with one embodiment of the invention.

FIG. 2 illustrates a wireless camera network 200 that includes a plurality of wireless node cameras 202 each having at least one antenna 204 for transmitting and receiving wireless signals to and from a network hub or access point (AP) 206. As shown in FIG. 2, the AP 206 also includes at least one antenna 208 for transmitting and receiving wireless signals to and from one or more of the plurality of wireless node cameras 202. As discussed in further detail below with respect to FIG. 3, each node camera 202 includes one or more image sensors for capturing visible still and/or video image data. This image data can then be transmitted wirelessly to AP 206, which can then relay the data to a control center 212 which is communicatively coupled to the AP 206 via a communication link 210.

The communication link 210 may be any wireless or wired communication link suitable for a particular application or network environment that is known in the art. In one exemplary embodiment, the communication link 210 is an Ethernet cable compliant with the IEEE 802.3 standard that communicatively couples the AP 206 with the control center 212.

The control center 212 provides access to data and information stored in the AP 206 to one or more authorized users of the wireless camera network 200. In one embodiment, the control center 212 may be a desktop computer or computer server, for example, that is connected to a larger computer network, e.g., a local area network (LAN), metropolitan area network (MAN) and/or the Internet. Thus, an authorized user having a network-enabled device (e.g., a smartphone or tablet computer) can communicate, through the larger computer network (e.g., Internet), with the control center 212, and hence with the AP 206. In this way, image data transmitted from one or more node cameras 202 to a storage unit in the AP 206 may be accessed via the Internet, for example, by the authorized user's network-enabled device, which stores and executes an application program for communicating with the control center 212 and/or AP 206.

In one embodiment, the control center 212 may be configured to communicate with more than one AP 206. In a further embodiment, the control center 212 may include a display and an application program for providing an interface for controlling wireless camera network 200, as well as allowing an authorized user to view or analyze images taken from individual node cameras 202. It will be appreciated that control center 212 may include various software, firmware and/or hardware components such as displays, storage equipment, and computer processing equipment, for performing various functions as may be desired for various applications or network environments. In one embodiment, control center 212 may execute automatic processes for evaluating and assessing images received from node cameras 202. For example, the control center 212 may execute image analysis processes for analyzing node camera images for risk assessment, as well as automated communication equipment for initiating and sending communications to an authorized user via the network communication paths discussed above.

Although four node cameras 202 are shown in FIG. 2, it is understood that more or fewer node cameras 202 may be utilized in any particular application. Furthermore, one or more node cameras 202, in addition to having an image sensor for capturing image and video data, may include one or more additional sensors for capturing different types of data such as invisible (e.g., infrared) light, acoustic, seismic, spectral, vibration, or other types of information. Alternatively, one or more of the node cameras 202 may be replaced by a different type of sensor node for sensing any other desired physical phenomenon that can be sensed (e.g., infrared light, acoustic, seismic, spectral, vibration, etc.).

In one embodiment, each node camera 202 in the wireless camera network 200 is constructed to be a self-contained, battery-powered, remote imaging device that wirelessly communicates with AP 206. Since each node camera 202 is powered by a battery pack and control unit, which is described in further detail below, it is desirable that each node camera 202 operate in a way that conserves battery power and minimizes the risk of unnecessary power drain and/or catastrophic failure (e.g., explosion or fire) of the battery pack, as discussed above. In this way, the node cameras 202 may be easily installed and distributed within a geographic area, without the need for any power outlets or wires, to wirelessly provide image information to AP 206 without the need for battery maintenance or replacement for an extended period of time.

Figure 3:
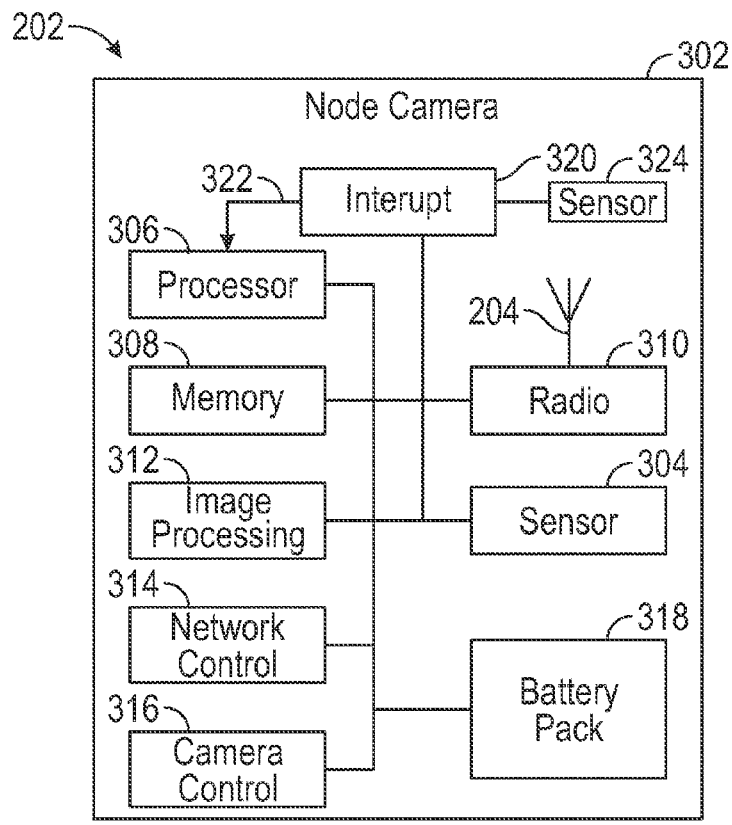
FIG. 3 is a block diagram of a battery-powered wireless camera, in accordance with one embodiment of the invention.

FIG. 3 illustrates a block diagram of a wireless node camera 202, in accordance with one embodiment of the invention. In one embodiment, node camera 202 has a small and compact housing 302 for enclosing and protecting the various camera components illustrated as blocks in FIG. 3. Node camera 202 includes a primary sensor 304 for capturing images (still and/or video) data. As used herein, "image data" refers to still image data, video image data, or both types of data. The sensor 304 may be, for example, a CMOS sensor for reduced power consumption, or may employ CCD imaging technology. The sensor may be configured to capture visible wavelength information, or may be set to detect other wavelengths, such as infrared. In an alternative embodiment, the sensor 304 may be a seismic, vibration, audio, spectrometer, or other type of sensor, that is known in the art.

Node camera 202 includes at least one processor 306 for providing control and processing capability to perform various functions as described in further detail below. The node camera 202 further includes at least one memory unit 308 for storing image data captured by the sensor 304, as well as storing instructions and/or application programs that are executed by the processor 306 to perform various functions. It is appreciated that the processor 306 can be implemented in accordance with various known technologies. In one embodiment, the processor 306 includes one or more circuits or units configurable to perform one or more data computing procedures or processes. For example, the processor 306 may include one or more processors, controllers, microprocessors, microcontrollers, application specific integrated circuits (ASICs), digital signal processors, programmable logic devices, field programmable gate arrays, or any combination of these devices or structures, or other known devices and structures.

Memory 308 can include one or more various data storage units known in the art such as, for example, non-volatile memory, volatile memory, random-access memory (RAM), dynamic random-access memory (DRAM), static random-access memory (SRAM), non-volatile RAM (flash memory), read-only memory (ROM), programmable read-only memory (PROM), electrically erasable programmable read-only memory (EEPROM), among others. Additionally, although FIG. 3 illustrates memory 308 as being separate from the processing unit 306, in various embodiments, all or part of memory 308 may be provided within one or more integrated circuit packages that make up the processor 306. It is understood that memory 308 can include various types of memories to perform various storage functions required by the processor 306 such as storing instructions and/or application programs to be executed by the processor 306, storing image data captured by sensor 304, providing buffers or registers for information or data to be acted upon by the processor 306, etc. In one embodiment, the memory 308 is formed as a semiconductor device which may or may not be integrated on the same integrated circuit (IC) chip on which the processor is formed.

In one embodiment, the processor 306 executes instructions and/or application programs stored in memory 308 to control various functions of the node camera 202, such as controlling the sensor 304 (e.g., when and for how long images are captured) and/or controlling a radio unit 310 (e.g., communication protocol). In one embodiment, the radio unit 310 includes a transceiver (not shown) for transmitting and receiving signals to and from the AP 206, via their respective antennas 204 and 208, in accordance with the WiFi communication protocol as prescribed by the IEEE 802.11x standards. It is appreciated, however, that the invention can be adapted to perform communications in accordance with any known or to be developed communication protocol, or even a proprietary communication protocol developed for a particular application.

As shown in FIG. 3, in one embodiment, the node camera 202 further includes an image processing unit 312, which may or may not be integrated as part of the processor 306. The image processing unit 312 performs desired processing of image data captured by sensor 304 such as, for example, compressing or encrypting the image data. In one embodiment, the image processing unit 310 applies a JPEG compression algorithm to images captured by sensor 304.

In one embodiment, the node camera 202 further includes a network control unit 314, which may or may not be integrated with the processor 306. The network control unit 314 defines and controls network settings such as how often the node camera 202 attempts to communicate with a hub/AP 206, or settings regarding encryption or compression, for example. Furthermore, network control unit 314 may include a unique ID for node camera 202 that enables the AP 206 to be associated with a particular node camera 202.

In a further embodiment, the node camera 202 further includes a camera control unit 316, which may or may not be integrated as part of the processor 306. The camera control unit 316 may set and control various operating parameters for the sensor 304 such as, for example, resolution, capture windows, timing and sequence of image capture, etc.

It is appreciated that in providing the various functions discussed above, the processor 306 cooperates with memory 308, which provides storage space for images captured by sensor 304, as well as storage space for instructions and/or application programs executed by the processor 306 and/or other units discussed above. In one embodiment, node camera 202 is a wireless camera that is completely powered by a battery pack unit 318, which allows the node camera 202 to be easily installed in any desired location within communication range of the AP 206 without the need for a dedicated external power source (e.g., a power outlet). It is further appreciated that in this configuration, it is desirable to maximize the life of the battery pack unit 318, as well as minimizing any risk of undue power drains or catastrophic failure (e.g., fire or explosion) as a result of mismatched, defective or damaged batteries within the battery pack unit 318.

In one embodiment, the life of the battery pack 318 is extended by having the node camera 202 normally operate in a "sleep mode," and only activating the node camera for necessary periods of time to perform one or more desired functions. In one exemplary embodiment, the default mode of operation of node camera 202 is a sleep mode wherein the processor 306 and/or one or more units, such as the radio unit 310, for example, are deactivated. In this mode, the processor 306, or any deactivated portion thereof, and one or more deactivated units are only activated on an "as needed" basis. In one embodiment, the node camera 202 includes an interrupt unit 320, which may or may not be integrated with the processor 306. The interrupt unit 320 is configured to generate an interrupt signal 322 that interrupts (e.g., awakes) the processor 306 and/or any other units on a predetermined periodic basis, or a set time based on a low power timer (not shown) that is executed by the interrupt unit 320. In one embodiment, this low power timer draws only approximately 5 to 10 micro amps of power. In alternative embodiments, the interrupt unit 320 can be configured to generate the interrupt signal 322 in response to detection of a triggering event (e.g., motion or audio detection) as may be detected by secondary sensor 324, which is discussed in further detail below.

In one embodiment, when the interrupt unit 320 generates the interrupt signal 322, both the processor 306 and the radio unit 310 are activated. After activation in this fashion, the node camera 202 acts according to its defined network controls as set by network control unit 314 and its defined camera controls as set by camera control unit 316. In one embodiment, when the node camera 202 first wakes up, it generates a request signal which is then transmitted by radio unit 310 via antenna 204. After the request signal has been transmitted, the radio unit 310 enters a listen mode for a defined short period of time. For example, this listen mode time period may be in the range of 20 to 50 milliseconds (ms). During this listen mode period, the radio unit 310 waits to receive an acknowledgment signal from the control hub/AP 206. If no acknowledgment signal is received during the listen mode period, the node camera 202 goes back to sleep until another interrupt signal 322 is generated.

If the hub/AP 206 does respond, then a communication link is established between the node camera 202 and the AP 206. The AP 206 may then command the node camera 202 to take additional action(s). These actions could include, for example, capturing an image, transmitting a stored image, transmitting status information, re-entering a sleep mode, etc. It is appreciated that the node camera power requirements increase dramatically while radio unit 310 and processor unit 306 are operating. In one embodiment, the radio unit 310 and processor 306 operate for only a short period of time, so the overall drain is not substantial. The overall life of the battery pack unit 318 is affected by how often the interrupt unit 320 causes the node camera 202 to wake up. For example, in one embodiment, if the node camera 202 is set to wake up and transmit a request signal to the AP 206 only once every 10 minutes, then it is estimated that the life of the battery pack unit 318 may be extended to about three years using current battery cell technologies. Of course, more frequent wake ups will result in a shorter battery life.

In one embodiment, the node camera 202 may include a secondary sensor 324 that can also be used to generate an interrupt signal. For example, secondary sensor 324 could be a microphone which generates an interrupt signal upon receiving an audio signal above a defined threshold. Alternatively, the secondary sensor 324 may be a motion sensor for sensing motion in a room, for example. Such secondary sensors 324 may be useful, for example, in security situations to detect if an unauthorized entry into a particular area has occurred. Upon detecting a substantial noise and/or motion, an interrupt signal 322 is generated, which then activates processor 306 and radio unit 310, as discussed above. The camera control unit 316 may be set such that if the secondary sensor 324 activates the processor 306 and/or radio 310, then the primary sensor 304 begins to immediately capture image data. It is appreciated that secondary sensor 324 may be any desired sensor known in the art, either now or in the future, to detect a physical phenomenon in accordance with a particular application or function. For example, the secondary sensor 324 may be a temperature sensor, an image sensor, or a vibration sensor, etc. In one embodiment, primary sensor 304 and secondary sensor 324 may be two different windows on the same CMOS image sensor.

Each of the units 304, 306, 308, etc., including the battery pack 318, of the node camera 202 discussed above can be electrically coupled to one another, as necessary or desired, by any means known in the art. In one embodiment, the node camera 202 includes a bus 326 having a plurality of conductive wires and/or traces for electrically coupling two or more of the units to one another and/or to the battery pack 318 as may be necessary or desired. Those of ordinary skill in the art will readily know how to make such electrical connections.

Figure 4:
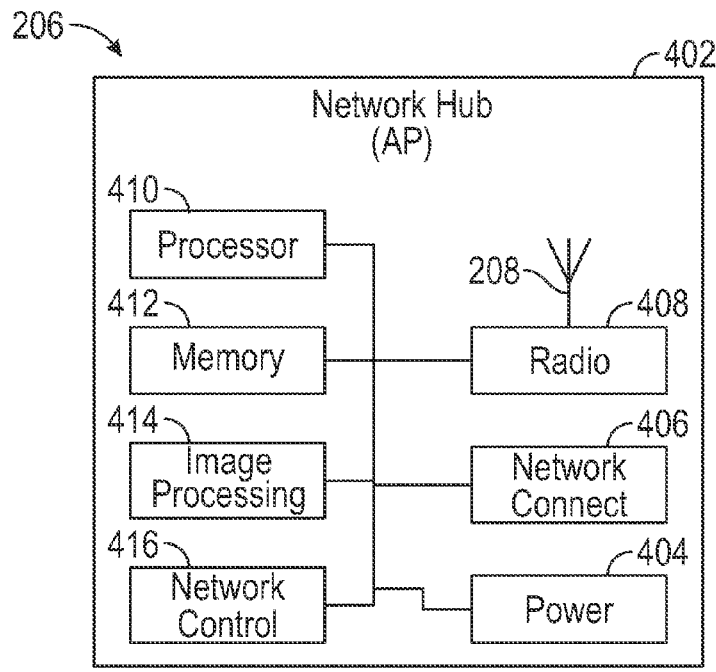
FIG. 4 is a block diagram of an access point (AP) that functions as a communication hub for one or more wireless cameras as shown in FIG. 3, in accordance with one embodiment of the invention.

FIG. 4 is a block diagram of an AP 206 (aka, "network hub"), in accordance with one embodiment of the invention. The AP 206 wirelessly communicates with, and controls access to the plurality of node cameras 202 by an authorized user of the wireless camera network 200 of FIG. 2. The AP 206 includes a housing 402 for containing all the component blocks or units illustrated in FIG. 4. In one embodiment, the AP 206 is configured to be installed in an area that has direct access to an enduring power source, such as a wall outlet. Alternatively or additionally, the AP 206 may include a secondary power source 404, which may include one or more primary (i.e., non-rechargeable) or secondary (i.e., rechargeable) batteries.

The AP 206 includes a network connection unit 406, that is configured to provide a communication interface between a larger computer network, such as the Internet, for example, and the wireless camera network 200. In one embodiment, numerous AP's 206 may be communicatively coupled to a central control center 212 to provide a larger wireless camera network consisting of a plurality of smaller wireless camera networks 200, as shown in FIG. 2. In this way, an authorized user can access data from a greater number of node cameras 202 distributed across a larger geographic area or more numerous locations within a building or campus, for example.

The AP 206 also includes a radio unit 408 coupled to antenna 208 for transmitting and receiving signals to and from the plurality of node cameras 202. In one embodiment, the radio unit 408 and antenna 208 are constructed and configured to facilitate two-way wireless communication with the plurality of node cameras 202 in accordance with the WiFi 802.11x communication standard protocol. The AP 206 also includes a processor 410 which operates in conjunction with memory 412 for various functions. The processor 410 can be implemented in accordance with various known technologies. In one embodiment, the processor 410 includes one or more circuits or units configurable to perform one or more data computing procedures or processes. For example, the processor 410 may include one or more processors, controllers, microprocessors, microcontrollers, application specific integrated circuits (ASICs), digital signal processors, programmable logic devices, field programmable gate arrays, or any combination of these devices or structures, or other known devices and structures. Such devices and structures may be included in one or more integrated circuit packages or chips.

In one embodiment, the radio unit 408 includes appropriate structures known in the art such as a communication interface that provides for or otherwise supports wireless communication with one or more wireless devices such as node cameras 202. The communication interface may further support communication with a computer network such as the Internet, and include a network interface device or card, a modem, a router, a switch, and/or other known structures for performing the communication functions described herein.

Memory 412 can include one or more various data storage units known in the art such as, for example, non-volatile memory, volatile memory, random-access memory (RAM), dynamic random-access memory (DRAM), static random-access memory (SRAM), non-volatile RAM (flash memory), read-only memory (ROM), programmable read-only memory (PROM), electrically erasable programmable read-only memory (EEPROM), among others. Additionally, although FIG. 4 illustrates memory 412 as being separate from the processing unit 410, in various embodiments, all or part of memory 412 may be provided within one or more integrated circuit packages that make up the processor 410. It is understood that memory 412 can include various types of memories to perform various storage functions required by the processor 410 such as storing instructions and/or application programs to be executed by the processor 410, storing image data transmitted by a node camera 202, providing buffers or registers for information or data to be acted upon by the processor 410, etc. In one embodiment, the memory 412 is formed as a semiconductor device which may or may not be integrated on the same integrated circuit (IC) chip on which the processor is formed. In one embodiment, the processor 410 executes instructions and/or application programs stored in memory 412 to control various functions of AP 206, such as when and how it communicates with one or more node cameras 202.

As shown in FIG. 4, in one embodiment, the AP 206 further includes an image processing unit 414, which may or may not be integrated as part of the processor 410. The image processing unit 414 can perform desired processing of image data captured and then transmitted by a node camera 202 such as, for example, compressing or encrypting the image data. performing image processing functions 92 and network management functions 94. In one embodiment, since the AP 206 is powered by an enduring power source (e.g., power outlet), some or all of the image processing, which consumes relatively large amounts of power, may be performed by the AP 206 instead of the node camera 202. Also, it is not necessary that the AP 206 be operated in a default sleep mode, although this is not precluded. It will be appreciated that, depending upon application specifics and any energy conservation goals, the radio unit 408 and/or processor 410 of the AP 206 may be operated in a sleep mode for periods of time to conserve energy.

In one embodiment, the AP 206 includes a network management unit 416, which may or may not be integrated with the processor 410. The network management unit 314 defines and controls network settings such as how the AP 206 communicates with the plurality of node cameras 202 and the control center 212, and the protocols used for such communications. In some embodiments, the network management unit 416 serves as a proxy for the node cameras 202 and handles common network protocol traffic (e.g., DHCP signals).
Unit Each of the units 404, 406, 408, etc., of the AP 206 discussed above can be electrically coupled to one another, as necessary or desired, by any means known in the art. In one embodiment, the AP 206 includes a bus 418 having a plurality of conductive wires and/or traces for electrically coupling two or more of the units to one another as may be necessary or desired. Those of ordinary skill in the art will readily know how to make such electrical connections.

In the wireless node camera 202 described above, it will be appreciated that conserving the power of the battery pack 318 and avoiding undue power drainage and/or catastrophic failure (e.g., fire or explosion) of the battery pack 318 is highly desirable. By conserving power and avoiding undue power drainage, users of the node cameras 202 will be required to change the battery packs much less frequently, which is not only more convenient but also less expensive for the user. Similarly, avoiding catastrophic failure of the battery pack 318 will also prevent potential damage to the node cameras 202 themselves and result in more reliable and less expensive implementation of the camera network 200 for consumers.

Figure 5:
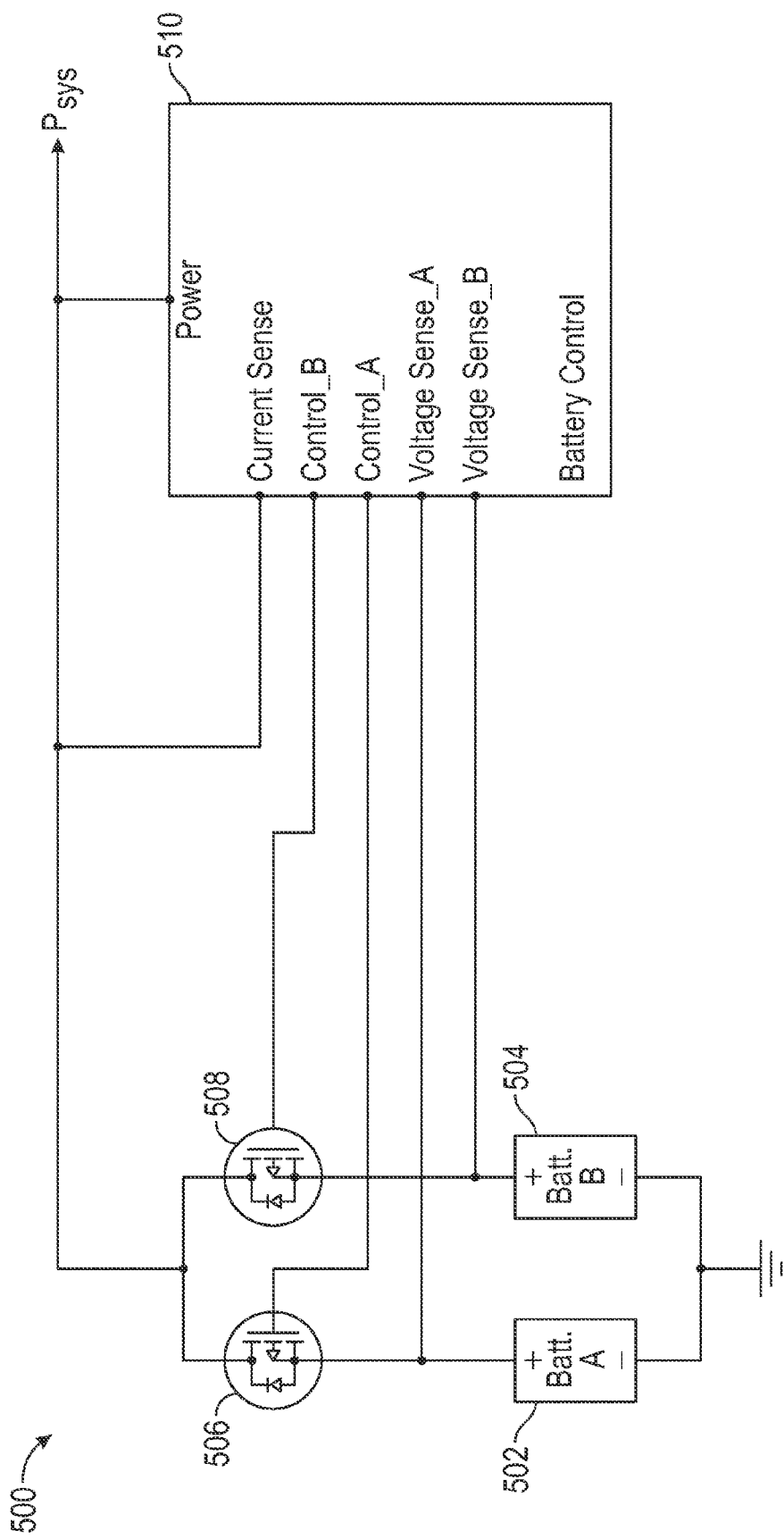
FIG. 5 is a circuit schematic of a battery pack and control system, in accordance with one embodiment of the invention.

FIG. 5 illustrates a schematic block diagram of a battery pack control system 500 that may be used in node camera 202, in accordance with one embodiment of the invention. The battery pack and control system 500 includes a first battery 502 (Battery_A) connected in parallel with a second battery 504 (Battery_B). Negative terminals (e.g., cathode terminals) of each of the batteries 502 and 504 are connected to electrical ground. The positive terminal (e.g., anode terminal) of the first battery 502 is connected to the drain terminal of a first P-channel metal oxide semiconductor field effect transistor (MOSFET) 506. The positive terminal (e.g., anode terminal) of the second battery 504 is connected to the drain terminal of a second P-channel MOSFET 508. The source terminals of both the first and second P-channel MOSFETs 506 and 508, respectively, are connected to a system power terminal $P_{SYS}$. The operation of MOSFETs 506 and 508 is described in further detail below, in accordance with one or more embodiments of the invention. It is appreciated that other types of electrically controlled switches and/or circuits may be used instead of P-channel MOSFET's to perform the same or similar functions, depending on the particular requirements of a given application, device or system.

The battery pack control system 500 further includes a battery control unit 510 for detecting whether one or more batteries are mismatched, defective and/or damaged and thereafter controlling the MOSFETs 506 and 508 to perform a battery pack management and protection protocol described in further detail below. The battery control unit 510 includes a first voltage sensing unit (Voltage Sense_A) coupled to the positive terminal of the first battery 502 for sensing a voltage provided by the first battery 502. The battery control unit 510 further includes a second voltage sensing unit (Voltage Sense_B) coupled to the positive terminal of the second battery 504 for sensing a voltage provided by the second battery 502. The battery control unit 510 further includes a first control unit (Control_A) coupled to the gate of the first P-channel MOSFET 506 for turning ON and OFF the first MOSFET 506 depending on the voltage sensed by the first voltage sensing unit (Voltage Sense_A). Similarly, the battery control unit 510 further includes a second control unit (Control_B) coupled to the gate of the second P-channel MOSFET 508 for turning ON and OFF the second MOSFET 508 depending on the voltage sensed by the second voltage sensing unit (Voltage Sense_B). It is appreciated that the battery control unit 510, and its associated units as described herein, can be implemented in hardware (e.g., processing and/or logic circuits), firmware, software and associated processing circuits for executing the software, or any combination of these known technologies. In one embodiment, the battery control unit 510, and its associated units described herein, is implemented in a semiconductor integrated circuit (IC) chip that includes various pins to provide the required connectivity and functionality described herein.

In one embodiment, the battery control unit 510 further includes a current sensing unit (Current Sense) for determining how much current is being drawn from each or both batteries 502 and 504, respectively. Various known methods and structures for sensing current may be utilized in accordance with the present invention. In one embodiment, a dedicated current sense resistor (not shown) may be utilized to determine how much current is flowing through the resistor, as can be determined by measuring a voltage drop across the resistor. In an alternative embodiment, each of the first and second MOSFETs 506 and 508 have a known drain-to-source resistance $R_{DS}$. Thus, the control unit 510 can measure a voltage drop across this known resistance $R_{DS}$ to determine the amount of current being drawn from each battery cell 502 and 504. These are only exemplary embodiments of how a current sensing function can be implemented in the present invention. In further embodiments, the battery control unit 510 uses known, predetermined/measured load currents for each state of the node camera 202 to determine the remaining capacity of the battery pack (a.k.a., "fuel gauging").

As shown in FIG. 5, the battery control unit 510 also includes a power terminal connected to the source terminals of the first and second MOSFETs 506 and 508. Thus, the first and second batteries 502 and 508 also supply power to the battery control unit 510, in addition to the other components and units of the node camera 202 discussed above.

In one embodiment, the battery control unit 510 and the first and second MOSFETs 506 and 508 are integrated within an integrated circuit (IC) chip containing at least the processor 306. In alternative embodiments, some or all of the circuitry and/or components that make up the MOSFETs 506, 508 and the battery control unit 510 may be implemented as discrete circuits or components outside of an IC chip containing the processor 306. In these latter embodiments, it is appreciated that some or all of the discrete circuits or components that make up the MOSFETs 506, 508 and the battery control unit 510 may be contained within the housing 302 of the node camera 202. In one embodiment, some or all of the discrete circuits or components that make up the MOSFETs 506, 508 and the battery control unit 510 may be contained within a housing (not shown) of the battery pack 318. It will be appreciated that various implementations are possible in accordance with various product/system applications and requirements, in accordance with various embodiments of the invention.

In FIG. 5, although only two batteries 502 and 504 are shown connected in parallel, it is appreciated that additional batteries (e.g., batteries C, D, etc.) may be added in parallel and further sensed and controlled as discussed above, in accordance with further embodiments of the invention. Furthermore, it is appreciated that each of the first and second batteries 502 and 504, respectively, may contain one or more battery cells connected in series to provide a first string of battery cells connected in series and a second string of battery cells connected in series, with the first and second strings being connected in parallel. If a string contains two or more battery cells, in such an embodiment, the positive terminal of the last battery cell in series is connected to the drain terminal of a respective MOSFET, while the negative terminal of the first battery cell in series is connected to ground. Since the battery control unit 510 sees each string of cells connected in series as a single battery, the structure and operation of the battery control unit 510 need not be changed. If one or more cells in either string is mismatched, defective or damaged, then such condition will be sensed by the corresponding sense units A and B of battery control unit 510, which thereafter controls respective first and second MOSFETs 506 and 508, as discussed herein.

As used herein, the terms "battery" and "battery string" are synonymous and refer to and encompass both a single battery cell having a positive and negative terminal as well as two or more battery cells, each having a positive and negative terminal, connected to each other in series and/or parallel configurations. It is understood that when a battery or battery string includes two more cells connected in series and/or parallel, such battery string still provides a single master positive terminal for connection to the drain terminal of a respective MOSFET 506 or 508 and a single master negative terminal for connection to ground. Multiple positive terminals of respective battery cells connected in parallel can be connected to the master positive terminal of the battery string, while multiple negative terminals of respective battery cells connected in parallel may be connected to the master negative terminal of the battery string, in various embodiments of the invention. It is understood that various configurations of a battery string may be utilized in various embodiments of the invention, including battery strings having on a single cell, or two or more cells connected in series, or two or more cells connected in parallel, or a combination of three or more cells connected in series and parallel configurations with respect to another.

In accordance with one exemplary embodiment of the invention, the operation of the battery pack control system 500 of FIG. 5, implemented within a node camera 202, is discussed below.

Upon an initial power ON of the node camera 202, both MOSFETs 506 and 508 are initially OFF. With both MOSFETs 506 and 508 turned OFF, the batteries 502 and 504 are relatively isolated from one another so that if one of the batteries is in a fault condition (e.g., a short circuit), the other battery will not be adversely affected. This is because the body diodes of the MOSFETs only allow current to flow from the drain to source of each MOSFET and, therefore, will not allow current from one battery to pass through the other battery, even when the other battery is in a fault condition (e.g., a short circuit). Even with both MOSFETs 506 and 508 in the OFF state, however, power can be delivered to the load $P_{SYS}$ through the body diodes of both MOSFETs in an classic diode OR configuration. It is appreciated, however, that power delivery across a MOSFET in the OFF state is less efficient when compared to power delivery across the MOSFET in an ON state because in the ON state the drain-to-source resistance $R_{DS}$ is much lower than the resistance of the body diode when the MOSFET is in the OFF state. Thus, it is desirable to turn ON both MOSFETs 506 and 508 for efficient power delivery and load sharing by both batteries 502 and 504.

After initially powering ON the node camera 202, with the MOSFETs OFF, voltages at the positive terminals of both batteries 502 and 504 are measured by the voltage sense units (Voltage Sense_A and Voltage Sense_B) of the battery control unit 510. If the voltages are the same then the battery control unit 510 determines that both batteries are GOOD and capable of load sharing by providing equal voltages and currents to the load. In the case of both batteries 502 and 504 being determined as GOOD, both MOSFETs 506 and 508 are turned ON by first and second control signals provided by respective units (Control_A and Control_B) of the battery control unit 510 to the gate terminals of the first and second MOSFETs 506 and 508, respectively. The status of both batteries 502 and 504 is stored within a memory (not shown) of the battery control unit 510 as having a status of Good. It is appreciated that the status of the batteries 502 and 504 can be stored in any memory within the node camera 202 that is accessible by the battery control unit 510. The MOSFETs 506 and 508 remain ON until one or more batteries are removed, or the voltage of one or both batteries 502 or 504 drops below a predetermined operating threshold of the load, which can be detected by the voltage sense units (Voltage Sense_A and Voltage Sense_B) of the battery control unit 510.

If voltage provided by one battery cell is higher than that provided by the other battery cell with both MOSFETs OFF (e.g., a difference of 20-200 mV), then it is assumed that the battery cell supplying the higher voltage will supply the majority of current to the load and so the corresponding MOSFET coupled to that battery cell is turned ON to improve power delivery efficiency. The other MOSFET remains OFF. The battery cell that is selected to supply the load is remembered as having a "Good" state, while the other battery is remembered has having an "Unknown" state.

During operation of the node camera 202, it is desirable to have both batteries 502 and 504 load share with both MOSFETs 506 and 508 turned ON to reduce power loss across the MOSFETs 506 and 508. It is not safe, however, to turn ON both MOSFETs unless both batteries 502 and 504 are determined to be in a "Good" state, which means they can sustain the same voltage under a load condition. In one embodiment, to determine if the batteries 502 and 504 are "Good," as well as determine each battery's loaded voltage output, each battery 502 and 504 is evaluated independently.

During operation of the node camera 202, there may be one battery having a loaded voltage capability that is "Unknown" while the other battery has a status of "Good." In one embodiment, the node camera 202 continues to operate on the "Good" battery, until the loaded voltage of the Good battery reaches some "small level" below the voltage level at the positive terminal of the "Unknown" battery with its corresponding MOSFET turned OFF. In one embodiment, this "small level" is set to be approximately equal to the forward voltage ($V_F$) of the body diode of the MOSFET switches used, which can be determined in advance. Once the loaded voltage of the "Good" battery reaches the small level below the voltage level at the positive terminal of the "Unknown" battery, the battery control unit 510 turns OFF the MOSFET for the "Good" battery and turns ON the MOSFET for the "Unknown" battery. If the Unknown battery is able to supply adequate current to the load while maintaining adequate voltage, then the status of the battery is changed from "Unknown" to "Good" and its loaded voltage is remembered.

If after both batteries 502 and 504 are determined to be "Good," one of the batteries is determined to have a higher loaded voltage than the other, the battery control unit 510 will continue to enable the battery with the higher loaded voltage by leaving ON its corresponding MOSFET and disable the other battery by turning OFF its corresponding MOSFET. The MOSFETs remain in this status until the loaded voltage of the enabled battery reaches the remembered loaded voltage of the disabled Good battery, at which point both MOSFETs are enabled and both batteries are truly load sharing.

If a battery 502 or 504 is damaged, defective or has reached the end of its battery life, such that its voltage drops below a predetermined minimum voltage, the battery control unit 510 disables (i.e., turns OFF) that battery's corresponding MOSFET. In one embodiment, an indication (e.g., a LED light, audible sound, a text message, etc.) can be provided by the node camera to inform a user that one or more batteries in the battery pack needs to be replaced. If both MOSFETs are turned OFF after the voltage levels of both batteries 502 and 504 are determined to be lower than the predetermined minimum voltage threshold, then power is removed from the product and battery control unit 510 will not re-enable either MOSFET unless a significant change in voltage is detected (i.e., new charged batteries are installed).

FIGS. 6A-6E illustrate flow diagrams of a battery pack management process 600 implemented by the battery pack control system 500 of FIG. 5, in accordance with one embodiment of the invention. The variables used in the flow diagrams of FIGS. 6A-6E are defined as follows: $V_{AU}$ refers to the voltage of battery A 502 in an unloaded state; $V_{BU}$ refers to the voltage of battery B 504 in an unloaded state; $V_{AL}$ refers to the voltage of battery A 502 in a loaded state; $V_{BL}$ refers to the voltage of battery B 504 in a loaded state; $V_{UMIN}$ refers to a minimum unloaded threshold voltage; $V_{LMIN}$ refers to a minimum loaded threshold voltage; and $V_{LS}$ refers to the voltage of enabled battery string(s) (e.g., battery A, or battery B, or both if both are enabled).

Figure 6A:
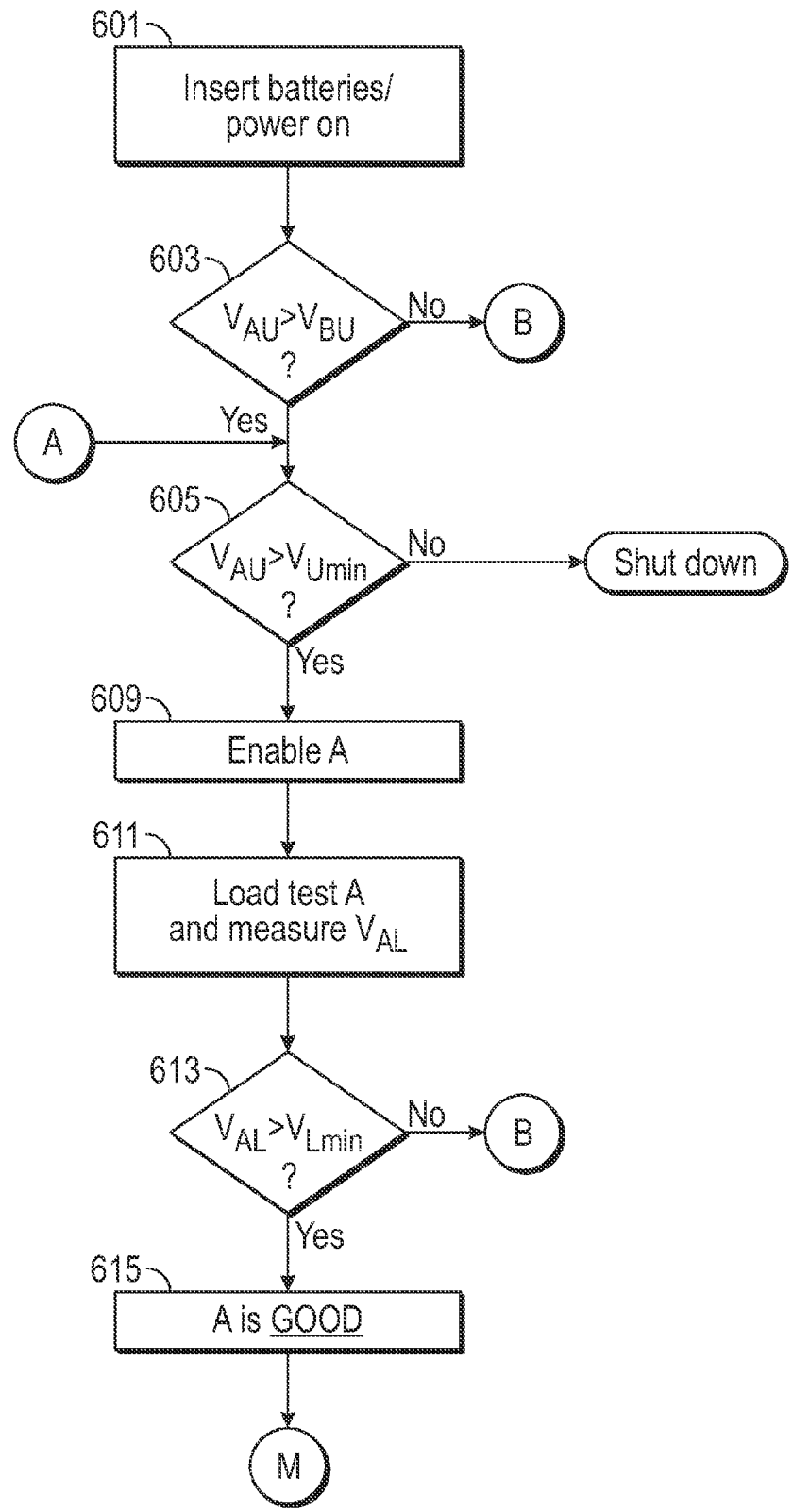
FIGS. 6A, 6B, 6C, 6D and 6E each illustrate flow diagrams of a battery pack management process, in accordance with one embodiment of the invention
Figure 6B:
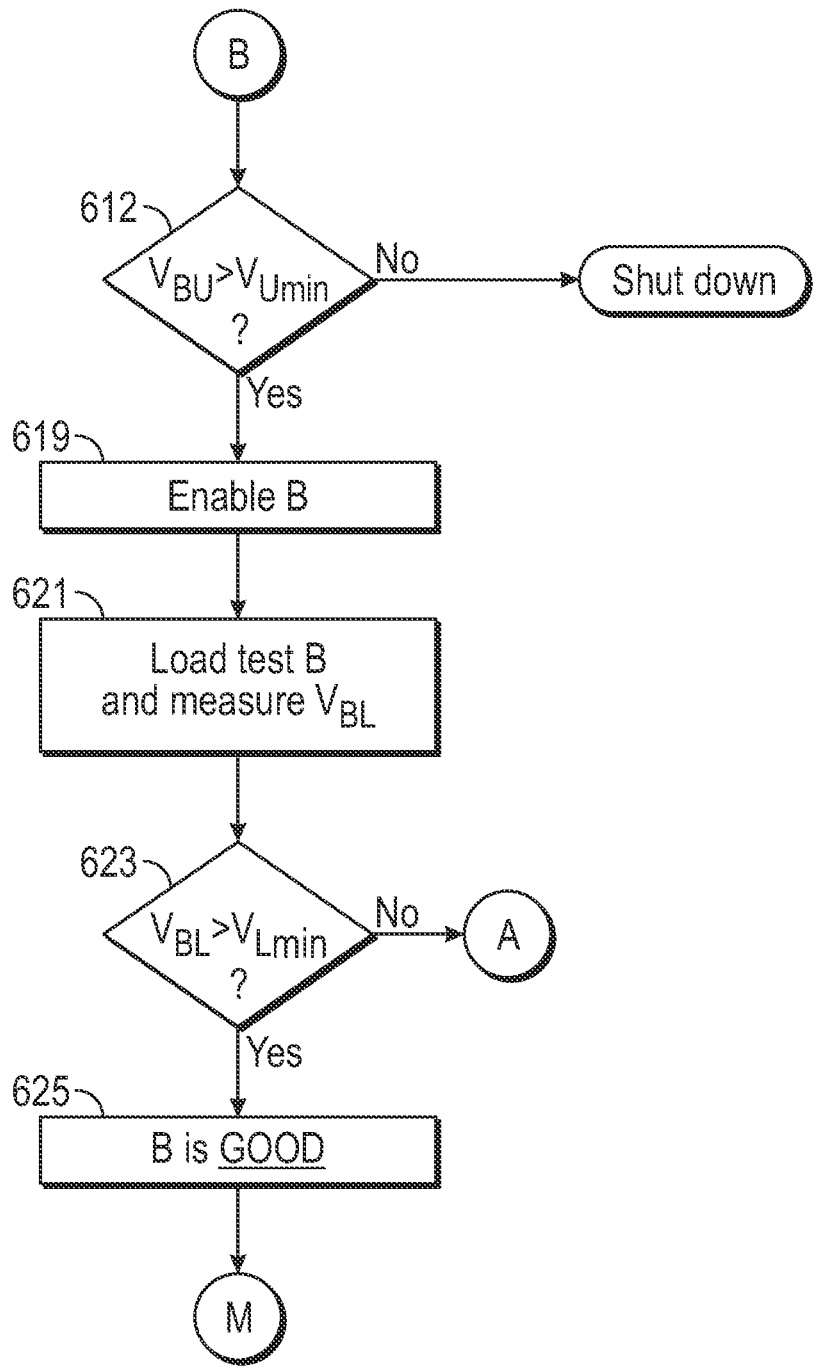

Referring to FIG. 6A, at step 601, batteries A and B are inserted into a device (e.g., a node camera 202) and connected to each other in a parallel configuration. Thereafter, the device is powered ON by pushing a power button on the device, for example. At step 603, it is determined whether $V_{AU}$ is greater than $V_{BU}$. If the answer is "no," the process proceeds to sub-process B, in which battery B is tested, as discussed in further detail below with respect to FIG. 6B. If the answer is "yes," then at step 605 it is determine whether $V_{AU}$ is greater than $V_{UMIN}$. If the answer at step 605 is "no," then at step 607, the device is shut down. In one embodiment, a shut down procedure in accordance with FIG. 6E is implemented, as discussed in further detail below. If the answer at step 605 is "yes," then at step 609, battery A is enabled to supply power to the device (e.g., MOSFET 506 is turned ON). At step 611, battery A is loaded (i.e., it provides a load current to the device) and $V_{AL}$ is measured. At step 613, it is determined whether $V_{AL}$ is greater than $V_{UMIN}$. If the answer at step 613 is "no," then the process goes to sub-process B where battery B is tested as shown in FIG. 6B. If the answer at step 613 is "yes," then at step 615, battery A is designated as "good" and this status is stored in a memory of the device. The process then proceeds to sub-process M, which is described in further detail below with reference to FIG. 6C.

FIG. 6B illustrates a flow diagram of a sub-process B for checking battery B 504, in accordance with one embodiment of the invention. As discussed above, if the answer at either steps 603 or 613 is "no," then at step 617, it is determined whether $V_{BU}$ is greater than $V_{UMIN}$. If the answer is "no," then the shutdown process of FIG. 6E is initiated as described in further detail below. If the answer is "yes," then at step 619, battery B 504 is enabled. Next, at step 621, battery B is load tested and its loaded voltage $V_{BL}$ is measured. Next, at step 623, it is determined whether $V_{BL}$ is greater than $V_{LMIN}$. If the answer is "no," then the sub-process reverts back to step 605 of FIG. 6A and repeats from that step as discussed above. If the answer is "yes," then at step 625, battery B is designated as "good" and this status is stored in a memory of the device. The process then proceeds to sub-process M as shown FIG. 6C.

Figure 6C:
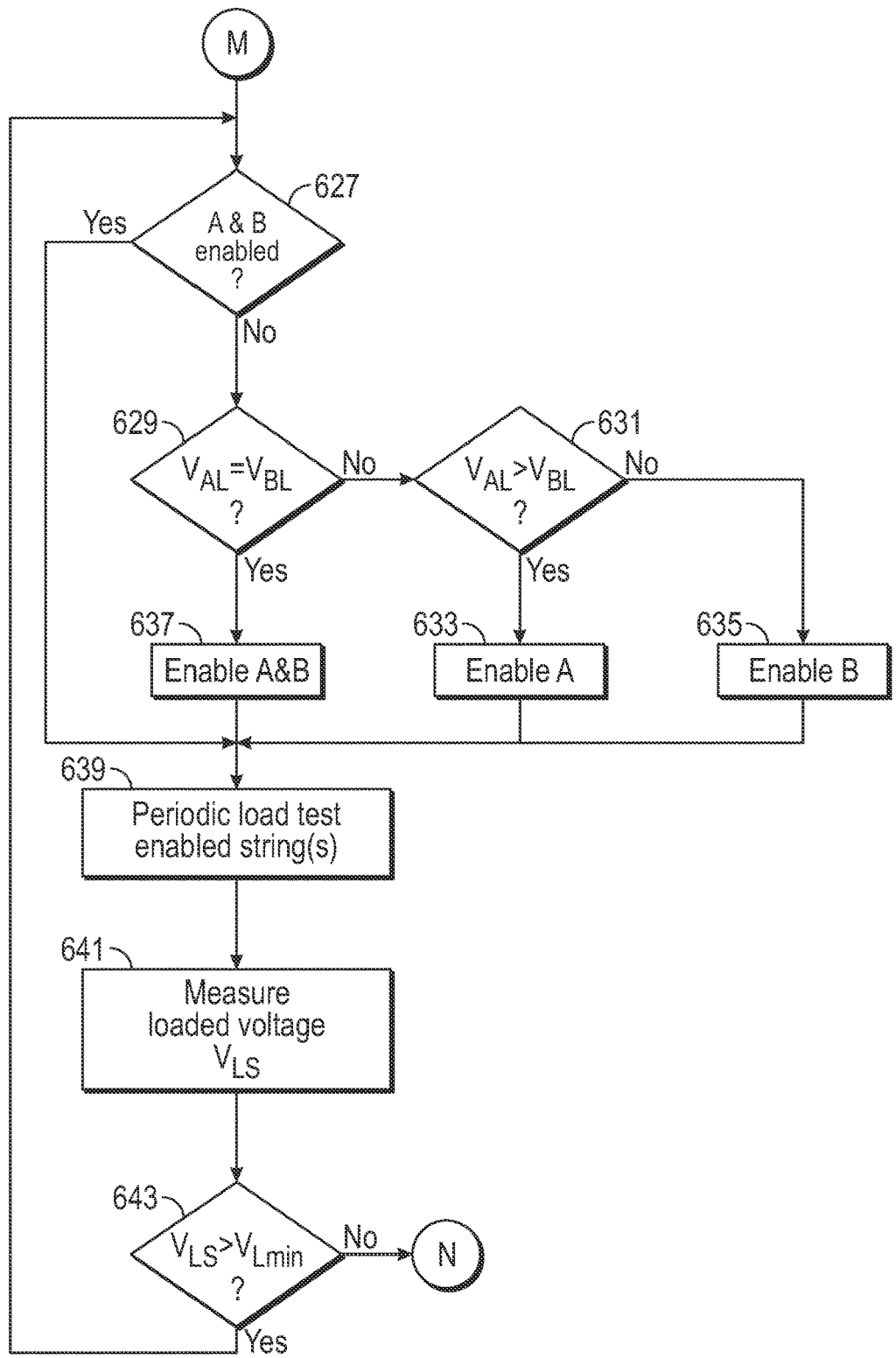

FIG. 6C illustrates a flow chart of a sub-process M for periodic load testing of batteries A and B, in accordance with one embodiment of the invention. At step 627, it is determined whether both batteries A and B are enabled. If the answer is "no," then at step 629, it is determined whether $V_{AL}=V_{BL}$. If the answer at step 629 is "no," then at step 631, it is determined whether $V_{AL}$ is greater than $V_{BL}$. If the answer at step 631 is "yes," then at step 633, battery A is enabled (if it is not already enabled). If the answer at step 631 is "no," then at step 635, battery B is enabled.

If the answer at step 629 was "yes," then at step 637, both batteries A and B are enabled. If the answer at step 627 was "yes," or from steps 633, 635 or 637 as described above, the sub-process M proceeds to step 639 in which a periodic load test of the enabled battery string(s) is performed. Next, at step 641, the voltage of each enabled battery in a loaded state ($V_{LS}$) is measured. Next at step 643, it is determined whether $V_{LS}$ is greater than $V_{LMIN}$. If the answer is "yes," then the sub-process reverts back to step 627 and repeats from there for further periodic load testing, as discussed above. If the answer is "no," then the sub-process M goes to sub-process N of FIG. 6D.

Figure 6D:
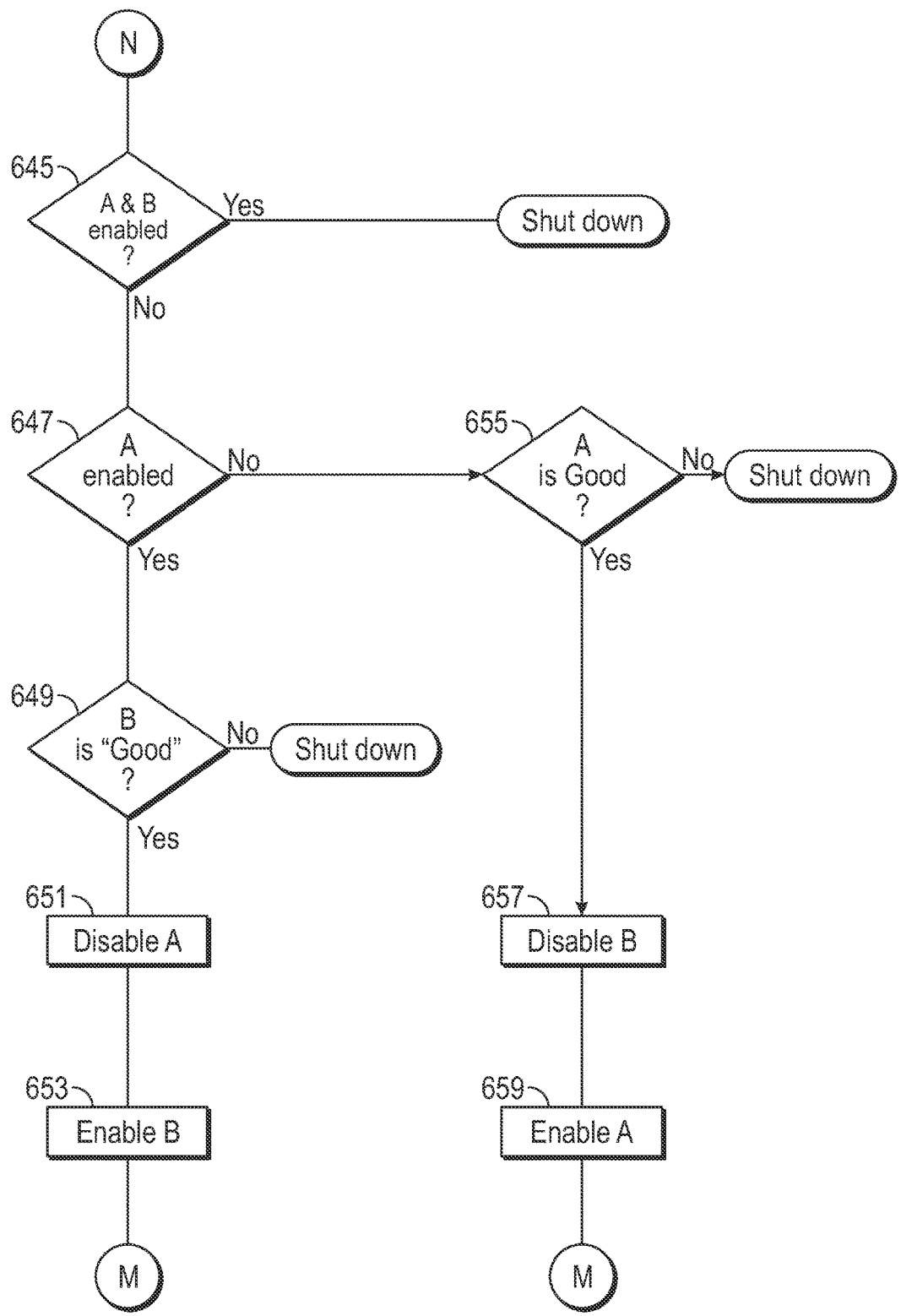
Figure 6E:
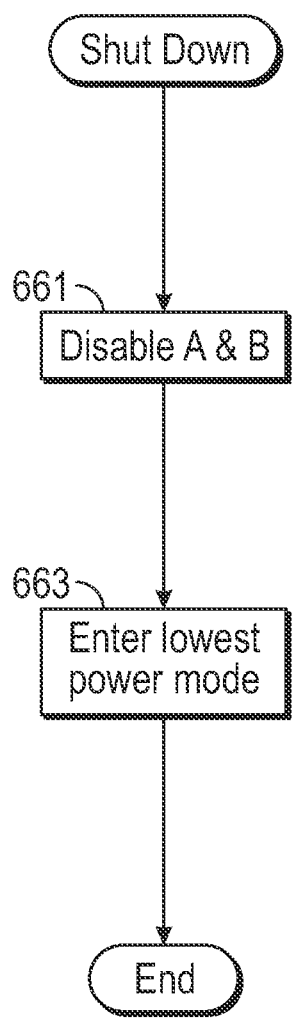

FIG. 6D illustrates a flow chart of a sub-process N for further disabling and enabling batteries if $V_{LS}$ is not greater than $V_{LMIN}$, in accordance with one embodiment. At step 645, it is determined whether both batteries A and B are enabled. If the answer is "yes," then the shutdown process of FIG. 6E is initiated. If the answer is "no," then at step 647, it is determined whether battery A is enabled. If the answer at step 647 is "yes," then at step 649, it is determined whether the status of battery B is "good." If battery B is not "good," then shutdown is initiated. If battery B is good, then at step 651, battery A is disabled. Next, at step 653, battery B is enabled and the sub-process N reverts back to sub-process M and repeats from step 627 as discussed above. If the answer at step 647 was "no," then at step 655, it is determined whether battery A is "good." If the answer is "no," then the shutdown process of FIG. 6E is initiated. If the answer is "yes," then at step 657, battery B is disabled. Next, at step 659, battery A is enabled, after which, the sub-process N reverts back to sub-process M and repeats from step 627 as discussed above.

FIG. 6E illustrates a flow chart of a shutdown process, in accordance with one embodiment of the invention. At step 661 both batteries A and B are disabled (if not already disabled). At step 663, the device is placed into its lowest power mode, which is a power mode that is predetermined in advance by a system designer. In one embodiment, the lowest power mode may be a complete power down of the entire device.

As described above, the invention provides a novel method and system for battery power management and protection against battery fault conditions. As would be appreciated by persons of ordinary skill in the art, some exemplary advantages provided by the invention include one or more of the following advantages:

Increases life and reliability of battery pack;

Allows safe mixing of different cell types, e.g., primary (non-rechargeable) and secondary (rechargeable) within a battery pack;

Allows safe mixing of different cell technologies, e.g., Li, Li-Ion & Li—FePO4, for example, within a battery pack;

Allows safe mixing of battery cells with different voltages (due to technology state of charge or batch related differences);

Provides circuit protection against failed cells;

Low power loss OR'ing through the use of low Rds(ON) MOSFETs compared to Diodes, further extending life of battery pack;

Provides self-starting; no boot strap operation required because either or both batteries A and B can provide necessary power during start up;

Low quiescent current power consumption due to use of low-power circuits;

Ability to disable batteries if voltage is too low (e.g., below 2 V) to avoid unnecessarily deep discharge of rechargeable battery cells.

The term "unit" as used herein refers to known structures such as hardware, firmware, non-transitory computer-readable media that stores computer-executable instructions, or any combination of these elements, for performing the associated functions described herein. Additionally, various units can be discrete units; however, as would be apparent to one of ordinary skill in the art, two or more units may be combined to form a single unit that performs the associated functions according to various embodiments of the invention. Conversely, a single unit may be divided into two or more units that perform respective associated functions according to various embodiments of the invention.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing unit having a command set which includes the encoded commands. Such an instruction may be encoded in the form of a machine language understood by the processing unit. Again, these are merely examples of an instruction and the invention is not limited in this respect.

As referred to herein the term "memory" refers to any type of long term, short term, volatile, nonvolatile, or other memory and is not to be limited to any particular type of memory or number of memories, or type of media upon which memory is stored. "Storage medium" as referred to herein relates to media capable of maintaining expressions which are perceivable by one or more machines. For example, a storage medium may comprise one or more storage devices for storing machine-readable instructions and/or information. Such storage devices may comprise any one of a number of media types including, for example, magnetic, optical or semiconductor storage media. Such storage devices may also comprise any type of long term, short term, volatile or non-volatile memory devices. However, these are merely examples of a storage medium, and the invention is not limited in these respects.

As used herein, the term "product" refers to any device, apparatus, system, or network that uses battery power for one or more functions.

Additionally, one or more of the functions described in this document may be performed by means of computer program code or instructions that are stored in a "non-transitory computer-readable medium," which is used herein to generally refer to media such as memory storage devices. These, and other forms of computer-readable media, may be involved in storing one or more instructions for use by a processor to cause the processor to perform specified operations. By way of example, and not limitation, computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed and executed by a computer.

While various embodiments of the invention have been described herein, it is understood that the disclosed embodiments are provided by way of example only, and not by way of limitation. For example, various embodiments of the invention are described in the context of a battery-powered, wireless node camera and associated network. It is appreciated, however, that the invention may be implemented in many other types of devices, systems and networks that utilize battery packs containing two or more batteries in a parallel configuration for supplying power to the device, system or network. Additionally, it should be understood that the various features and functionality described in connection with one or more of the individual embodiments are not limited in their applicability to the particular embodiment(s) with which they are described, but instead can be applied, alone or in some combination, to one or more of the other embodiments of the invention, whether or not such embodiments are explicitly described and whether or not such features are presented as being a part of a particular described embodiment. Thus, the claimed invention is not necessarily limited to the exemplary embodiments described herein but, rather, should be given the scope commensurate with the plain and ordinary meaning of the claims.

What is claimed is:

1. A wireless camera system, comprising:
a plurality of battery-powered, wireless node cameras, each node camera comprising an image sensor for capturing image data, a radio unit for performing wireless communications, at least one processing unit for controlling the image sensor and radio unit, and a battery control unit; and
an access point configured to communicate wirelessly with each of the node cameras, and further configured to communicate with a control center that communicatively couples the access point to a computer network,
wherein the battery control unit in each node camera, comprises:
a first battery and a second battery coupled to each other in a parallel configuration, each of the first and second batteries having a negative terminal coupled to an electrical ground;
a first switch having a first terminal coupled to a positive terminal of the first battery and a second terminal coupled to a power terminal of a respective node camera;

a second switch having a third terminal coupled to a positive terminal of the second battery and a fourth terminal coupled to the power terminal;
a first voltage sense unit coupled to the positive terminal of the first battery for sensing a voltage at the positive terminal of the first battery;
a second voltage sense unit coupled to the positive terminal of the second battery for sensing a voltage at the positive terminal of the second battery;
a first control unit coupled to the first switch for controlling the first switch in response to the voltage sensed by the first voltage sense unit; and
a second control unit coupled to the second switch for controlling the second switch in response to the voltage sensed by the second voltage sense unit, wherein each respective battery control unit is configured to:
determine if a voltage output of the first battery in an unloaded state ($V_{AU}$) is greater than a voltage output of the second battery in an unloaded state ($V_{BU}$);
in response to $V_{AU}$ being determined to be greater than $V_{BU}$, determine if $V_{AU}$ is greater than a first minimum threshold voltage ($V_{UMIN}$);
in response to $V_{AU}$ being determined to be greater than $V_{UMIN}$, turn on the first switch to enable the first battery to provide power to a respective node camera and thereafter measure a voltage output of the first battery in a loaded state ($V_{AL}$);
in response to $V_{AL}$ being greater than a second minimum threshold voltage ($V_{LMIN}$), determining that a status of the first battery is good and storing the status of the first battery in a memory of the respective node camera;
in response to $V_{AU}$ being determined not to be greater than $V_{BU}$, determine if $V_{BU}$ is greater than $V_{UMIN}$; and
in response to $V_{BU}$ being determined to be greater than $V_{UMIN}$, turn on the second switch to enable the second battery to provide power to the respective node camera and thereafter measure a voltage output of the second battery in a loaded state ($V_{BL}$);
in response to $V_{BL}$ being greater than $V_{LMIN}$, determining that a status of the second battery is good and storing the status of the second battery in a memory of the respective node camera; and
in response to neither the status of the first and second batteries being determined to be good, initiate a predetermined shutdown procedure for the respective node camera.

2. The wireless camera system of claim 1, wherein:
the first switch comprises a first P-channel metal oxide semiconductor field effect transistor (MOSFET) having a drain terminal coupled to the positive terminal of the first battery, a source terminal coupled to the power terminal and a gate terminal coupled to the first control unit; and
the second switch comprises a second P-channel MOSFET having a drain terminal coupled to the positive terminal of the second battery, a source terminal coupled to the power terminal and a gate terminal coupled to the second control unit.

3. The wireless camera system of claim 1, wherein each respective battery control unit is further configured to:
determine if a voltage of the first battery in a loaded state ($V_{AL}$) is equal to a voltage of the second battery in a loaded state ($V_{BL}$); and
in response to determining that $V_{AL}$ is equal to $V_{BL}$, turn on both the first and second switches to enable both the first and second batteries to provide power to a respective wireless node camera.

4. The wireless camera system of claim 3, wherein each respective battery control unit is further configured to:
in response to determining that $V_{AL}$ is not equal to $V_{BL}$, determining which of $V_{AL}$ or $V_{BL}$ is greater than the other;
in response to determining that $V_{AL}$ is greater than $V_{BL}$, turning on the first switch to enable the first battery to provide power to the device; and
in response to determining that $V_{BL}$ is greater than $V_{AL}$, turning on the second switch to enable the second battery to provide power to the device.

5. The wireless camera system of claim 4, wherein each respective battery control unit is further configured to:
periodically load test one or more enabled batteries and determine if a loaded voltage output of the one or more enabled batteries is greater than $V_{LMIN}$; and
in response to determining that no enabled battery has a loaded voltage output greater than $V_{LMIN}$, initiating a predetermined shutdown procedure for the device.

6. A battery-powered, wireless camera comprising:
an image sensor for capturing image data;
a radio unit for performing wireless communications with at least one external device;
a processor for controlling the image sensor and radio unit; and
a battery control unit, wherein the battery control unit comprises:
a first battery and a second battery coupled to each other in a parallel configuration, each of the first and second batteries having a negative terminal coupled to an electrical ground;
a first switch having a first terminal coupled to a positive terminal of the first battery and a second terminal coupled to a power terminal of a respective node camera;
a second switch having a third terminal coupled to a positive terminal of the second battery and a fourth terminal coupled to the power terminal;
a first voltage sense unit coupled to the positive terminal of the first battery for sensing a voltage at the positive terminal of the first battery;
a second voltage sense unit coupled to the positive terminal of the second battery for sensing a voltage at the positive terminal of the second battery;
a first control unit coupled to the first switch for controlling the first switch in response to the voltage sensed by the first voltage sense unit; and
a second control unit coupled to the second switch for controlling the second switch in response to the voltage sensed by the second voltage sense unit, wherein the battery control unit is configured to:
determine if a voltage output of the first battery in an unloaded state ($V_{AU}$) is greater than a voltage output of the second battery in an unloaded state ($V_{BU}$);
in response to $V_{AU}$ being determined to be greater than $V_{BU}$, determine if $V_{AU}$ is greater than a first minimum threshold voltage ($V_{UMIN}$);
in response to $V_{AU}$ being determined to be greater than $V_{UMIN}$, turn on the first switch to enable the first battery to provide power to the wireless camera and thereafter measure a voltage output of the first battery in a loaded state ($V_{AL}$);

in response to $V_{AL}$ being greater than a second minimum threshold voltage ($V_{LMIN}$), determining that a status of the first battery is good and storing the status of the first battery in a memory of the wireless camera;

in response to $V_{AU}$ being determined not to be greater than $V_{BU}$, determine if $V_{BU}$ is greater than $V_{UMIN}$; and in response to $V_{BU}$ being determined to be greater than $V_{UMIN}$, turn on the second switch to enable the second battery to provide power to the wireless camera and thereafter measure a voltage output of the second battery in a loaded state ($V_{BL}$);

in response to $V_{BL}$ being greater than $V_{LMIN}$, determining that a status of the second battery is good and storing the status of the second battery in a memory of the wireless camera; and in response to neither the status of the first and second batteries being determined to be good, initiate a predetermined shutdown procedure for the wireless camera.

7. The battery-powered wireless camera of claim 6, wherein:

the first switch comprises a first P-channel metal oxide semiconductor field effect transistor (MOSFET) having a drain terminal coupled to the positive terminal of the first battery, a source terminal coupled to the power terminal and a gate terminal coupled to the first control unit; and the second switch comprises a second P-channel MOSFET having a drain terminal coupled to the positive terminal of the second battery, a source terminal coupled to the power terminal and a gate terminal coupled to the second control unit.

8. The battery-powered wireless camera of claim 6, wherein the battery control unit is further configured to:

determine if a voltage of the first battery in a loaded state ($V_{AL}$) is equal to a voltage of the second battery in a loaded state ($V_{BL}$); and in response to determining that $V_{AL}$ is equal to $V_{BL}$, turn on both the first and second switches to enable both the first and second batteries to provide power to the wireless camera.

9. The battery-powered wireless camera of claim 8, wherein the battery control unit is further configured to:

in response to determining that $V_{AL}$ is not equal to $V_{BL}$, determining which of $V_{AL}$ or $V_{BL}$ is greater than the other;

in response to determining that $V_{AL}$ is greater than $V_{BL}$, turning on the first switch to enable the first battery to provide power to the device; and in response to determining that $V_{BL}$ is greater than $V_{AL}$, turning on the second switch to enable the second battery to provide power to the wireless camera.

10. The battery-powered wireless camera of claim 9, wherein the battery control unit is further configured to:

periodically load test one or more enabled batteries and determine if a loaded voltage output of the one or more enabled batteries is greater than $V_{LMIN}$; and in response to determining that no enabled battery has a loaded voltage output greater than $V_{LMIN}$, initiating a predetermined shutdown procedure for the wireless camera.

11. A battery control unit for managing battery power supplied to a product, the battery control unit comprising:

a first battery and a second battery coupled to each other in a parallel configuration, each of the first and second batteries having a negative terminal coupled to an electrical ground of the product;

a first switch having a first terminal coupled to a positive terminal of the first battery and a second terminal coupled to a power terminal of the product;

a second switch having a third terminal coupled to a positive terminal of the second battery and a fourth terminal coupled to the power terminal;

a first voltage sense unit coupled to the positive terminal of the first battery for sensing a voltage at the positive terminal of the first battery;

a second voltage sense unit coupled to the positive terminal of the second battery for sensing a voltage at the positive terminal of the second battery;

a first control unit coupled to the first switch for controlling the first switch in response to the voltage sensed by the first voltage sense unit; and a second control unit coupled to the second switch for controlling the second switch in response to the voltage sensed by the second voltage sense unit, wherein the battery control unit is configured to:

determine if a voltage output of the first battery in an unloaded state ($V_{AU}$) is greater than a voltage output of the second battery in an unloaded state ($V_{BU}$);

in response to $V_{AU}$ being determined to be greater than $V_{BU}$, determine if $V_{AU}$ is greater than a first minimum threshold voltage ($V_{UMIN}$);

in response to $V_{AU}$ being determined to be greater than $V_{UMIN}$, turn on the first switch to enable the first battery to provide power to the product and thereafter measure a voltage output of the first battery in a loaded state ($V_{AL}$);

in response to $V_{AL}$ being greater than a second minimum threshold voltage ($V_{LMIN}$), determining that a status of the first battery is good and storing the status of the first battery in a memory of the product;

in response to $V_{AU}$ being determined not to be greater than $V_{BU}$, determine if $V_{BU}$ is greater than $V_{UMIN}$; and in response to $V_{BU}$ being determined to be greater than $V_{UMIN}$, turn on the second switch to enable the second battery to provide power to the product and thereafter measure a voltage output of the second battery in a loaded state ($V_{BL}$);

in response to $V_{BL}$ being greater than $V_{LMIN}$, determining that a status of the second battery is good and storing the status of the second battery in a memory of the product; and in response to neither the status of the first and second batteries being determined to be good, initiate a predetermined shutdown procedure for the product.

12. The battery control unit of claim 11, wherein the battery control unit is further configured to:

determine if a voltage of the first battery in a loaded state ($V_{AL}$) is equal to a voltage of the second battery in a loaded state ($V_{BL}$); and in response to determining that $V_{AL}$ is equal to $V_{BL}$, turn on both the first and second switches to enable both the first and second batteries to provide power to the product.

13. The battery control unit of claim 12, wherein the battery control unit is further configured to:

in response to determining that $V_{AL}$ is not equal to $V_{BL}$, determine which of $V_{AL}$ or $V_{BL}$ is greater than the other;

in response to determining that $V_{AL}$ is greater than $V_{BL}$, turn on the first switch to enable the first battery to provide power to the product; and in response to determining that $V_{BL}$ is greater than $V_{AL}$, turn on the second switch to enable the second battery to provide power to the product.

14. The battery control unit of claim 13, wherein the battery control unit is further configured to:
    periodically load test one or more enabled batteries and determine if a loaded voltage output of the one or more enabled batteries is greater than $V_{LMIN}$; and
    in response to determining that no enabled battery has a loaded voltage output greater than $V_{LMIN}$, initiate a predetermined shutdown procedure for the product.

15. A method for managing battery power supplied to a device containing a battery pack having a first battery and a second battery coupled to each other in a parallel configuration, the method comprising:
    determining if a voltage output of the first battery in an unloaded state ($V_{AU}$) is greater than a voltage output of the second battery in an unloaded state ($V_{BU}$);
    in response to $V_{AU}$ being determined to be greater than $V_{BU}$, determining if $V_{AU}$ is greater than a first minimum threshold voltage ($V_{UMIN}$);
    in response to $V_{AU}$ being determined to be greater than $V_{UMIN}$, turning on the first switch to enable the first battery to provide power to the device and thereafter measure a voltage output of the first battery in a loaded state ($V_{AL}$);
    in response to $V_{AL}$ being greater than a second minimum threshold voltage ($V_{LMIN}$), determining that a status of the first battery is good and storing the status of the first battery in a memory of the device;
    in response to $V_{AU}$ being determined not to be greater than VBU, determining if $V_{BU}$ is greater than $V_{UMIN}$; and
    in response to $V_{BU}$ being determined to be greater than $V_{UMIN}$, turning on the second switch to enable the second battery to provide power to the device and thereafter measure a voltage output of the second battery in a loaded state ($V_{BL}$);
    in response to $V_{BL}$ being greater than $V_{LMIN}$, determining that a status of the second battery is good and storing the status of the second battery in a memory of the device; and
    in response to neither the status of the first and second batteries being determined to be good, initiating a predetermined shutdown procedure for the device.

16. The method of claim 15 further comprising:
    determining if a voltage of the first battery in a loaded state ($V_{AL}$) is equal to a voltage of the second battery in a loaded state ($V_{BL}$); and
    in response to determining that $V_{AL}$ is equal to $V_{BL}$, turning on both the first and second switches to enable both the first and second batteries to provide power to the device.

17. The method of claim 16 further comprising:
    in response to determining that $V_{AL}$ is not equal to $V_{BL}$, determining which of $V_{AL}$ or $V_{BL}$ is greater than the other;
    in response to determining that $V_{AL}$ is greater than $V_{BL}$, turning on the first switch to enable the first battery to provide power to the device; and
    in response to determining that $V_{BL}$ is greater than $V_{AL}$, turning on the second switch to enable the second battery to provide power to the device.

18. The method of claim 17 further comprising:
    periodically load testing one or more enabled batteries and determine if a loaded voltage output of the one or more enabled batteries is greater than $V_{LMIN}$; and
    in response to determining that no enabled battery has a loaded voltage output greater than $V_{LMIN}$, initiating a predetermined shutdown procedure for the device.

19. A non-transitory computer-readable medium for storing computer-executable instructions that when executed perform a method for managing battery power supplied to a device containing a battery pack having a first battery and a second battery coupled to each other in a parallel configuration, the method comprising:
    determining if a voltage output of the first battery in an unloaded state ($V_{AU}$) is greater than a voltage output of the second battery in an unloaded state ($V_{BU}$);
    in response to $V_{AU}$ being determined to be greater than $V_{BU}$, determining if $V_{AU}$ is greater than a first minimum threshold voltage ($V_{UMIN}$);
    in response to $V_{AU}$ being determined to be greater than $V_{UMIN}$, turning on the first switch to enable the first battery to provide power to the device and thereafter measure a voltage output of the first battery in a loaded state ($V_{AL}$);
    in response to $V_{AL}$ being greater than a second minimum threshold voltage ($V_{LMIN}$), determining that a status of the first battery is good and storing the status of the first battery in a memory of the device;
    in response to $V_{AU}$ being determined not to be greater than $V_{BU}$, determining if $V_{BU}$ is greater than $V_{UMIN}$; and
    in response to $V_{BU}$ being determined to be greater than $V_{UMIN}$, turning on the second switch to enable the second battery to provide power to the device and thereafter measure a voltage output of the second battery in a loaded state ($V_{BL}$);
    in response to $V_{BL}$ being greater than $V_{LMIN}$, determining that a status of the second battery is good and storing the status of the second battery in a memory of the device; and
    in response to neither the status of the first and second batteries being determined to be good, initiating a predetermined shutdown procedure for the device.

20. The non-transitory computer-readable medium of claim 19, wherein the method further comprises:
    determining if a voltage of the first battery in a loaded state ($V_{AL}$) is equal to a voltage of the second battery in a loaded state ($V_{BL}$); and
    in response to determining that $V_{AL}$ is equal to $V_{BL}$, turning on both the first and second switches to enable both the first and second batteries to provide power to the device.

21. The non-transitory computer-readable medium of claim 20, wherein the method further comprises:
    in response to determining that $V_{AL}$ is not equal to $V_{BL}$, determining which of VAL or VBL is greater than the other;
    in response to determining that $V_{AL}$ is greater than $V_{BL}$, turning on the first switch to enable the first battery to provide power to the device; and
    in response to determining that $V_{BL}$ is greater than $V_{AL}$, turning on the second switch to enable the second battery to provide power to the device.

22. The non-transitory computer-readable medium of claim 21, wherein the method further comprises:
    periodically load testing one or more enabled batteries and determine if a loaded voltage output of the one or more enabled batteries is greater than $V_{LMIN}$; and
    in response to determining that no enabled battery has a loaded voltage output greater than $V_{LMIN}$, initiating a predetermined shutdown procedure for the-device.

* * * * *